United States Patent [19]
Choucri et al.

[11] Patent Number: 5,752,023
[45] Date of Patent: May 12, 1998

[54] NETWORKED DATABASE SYSTEM FOR GEOGRAPHICALLY DISPERSED GLOBAL SUSTAINABILITY DATA

[75] Inventors: Nazli Choucri, Chestnut Hill, Mass.; Juliana Kousoum, Chantilly, Va.

[73] Assignee: Massachusetts Institute of Technology, Cambridge, Mass.

[21] Appl. No.: 637,074

[22] Filed: Apr. 24, 1996

[51] Int. Cl.[6] ............................................. G06F 17/30
[52] U.S. Cl. .................................... 395/610; 395/615
[58] Field of Search ................................ 395/610, 615

[56] References Cited

U.S. PATENT DOCUMENTS

| | | | |
|---|---|---|---|
| 5,089,954 | 2/1992 | Rago | 395/615 |
| 5,495,607 | 2/1996 | Pisello et al. | 395/610 |
| 5,497,463 | 3/1996 | Stein et al. | 395/200.03 |
| 5,596,744 | 1/1997 | Dao et al. | 395/610 |
| 5,628,011 | 5/1997 | Ahamed et al. | 395/610 |
| 5,634,053 | 5/1997 | Noble et al. | 395/604 |
| 5,652,717 | 7/1997 | Miller et al. | 364/578 |

FOREIGN PATENT DOCUMENTS

WO 95/23371  8/1995  WIPO .

OTHER PUBLICATIONS

Booker, E., "NaviSoft Weaves Simpler Web," *Computerworld*, p. 57 (Jul. 17, 1995).

"Grif Brings Collaborative Authoring to the Web: Remote Locking and Updating of Individual Hyperlink Anchors," (Symposia)(Product Announcement) *Seybold Report on Desktop Publishing*, 9(9):5(2) (May 8, 1995).

Choucri, N., "Globalization of MIT: GSSD on the WWW," *The MIT Faculty Newsletter*, VIII(1) (Oct. 1995).

Hartnett, W.J., "Computer–aided Market Transactions Esp. Privatisation of State–Owned Industries—Collecting for Execution Portfolio Transactions Submitted by Portfolio Owners, Aggregating Collected Transactions into Single Database and Consummating by Matching Buy and Sell Transactions," (From *Derwent Info Ltd.*, Abstract WO 9410637 A)(1995).

Busuioc et al., "Management of communications Network. e.g., for Global Multi–Service Network—Automates Management Functions through use of Co–Operating intelligent Software Agent Technology, e.g., for Maintaining Routes through Network," (From *Derwent Info Ltd.*, Abstract WO 9515635 A)(1995).

Bell et al. "Method and Apparatus for Structuring and Managing Human Communication by Explicitly Defining the Types of Communications Permitted Between Participants," *IFI/Plenum Data Corp.* (Abstract of U.S. Patent 5,208,748, issued May 4, 1995).

*Primary Examiner*—Wayne Amsbury
*Attorney, Agent, or Firm*—Testa, Hurwitz & Thibeault, LLP

[57] ABSTRACT

A system of computers and implemented method for identifying and organizing data relating to a global problem into a plurality of hierarchies of interrelated categories stored on a plurality of computer systems interconnected by a network. Each category of the hierarchies is divided into a topic having at least one concept and datatype. The method includes the steps of defining the connectivities between data among and within the hierarchies of interrelated categories stored on the plurality of computer systems; providing a mapping between the data related to each category and the computer systems storing the data; and providing access, for each of the entities, to the data within any of the categories stored on any of the computer systems in response to the mapping.

12 Claims, 7 Drawing Sheets

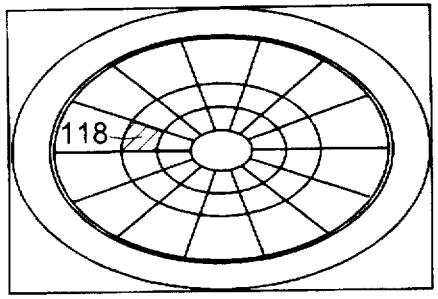

Slice: Energy uses and sources
Ring: Sustainability Problems

[Definition/Theory|Indicators|Events|Organizations|Models|Case studies/Profiles|
Bibliography|Connectivities|

---

Concepts in this cell:

Depletion of non-renewable resources
[Definition/Theory|Indicators|Events|Organizations|Models|Case studies/Profiles|
Bibliography|Connectivity|
(non-renewable resources, proven and estimated global reserves, global reserves, oil, coal, natural gas, fuel, wood, deforestation, excessive fuel-wood use)

Pollution, wastes, ecological effects
[Definition/Theory|Indicators|Events|Organizations|Models|Case studies/Profiles|
Bibliography|Connectivity|
{power plant emissions, pollution, environmental decay, $CO_2$ emissions, $CH_4$, green house effect, NOx & SOx, acid rain, health hazards, disposal of hazardous wastes, dioxins from WTE facilities, nuclear waste, hazardous waste, mining, fuel spills, oil spills, restricted river flows, ecosystem effects, biodiversity, reseveoir creation, population displacement}

Energy uses and sources Outline

BACK to Activity/Conditions
NEXT to Technical Solutions

Fig. 4

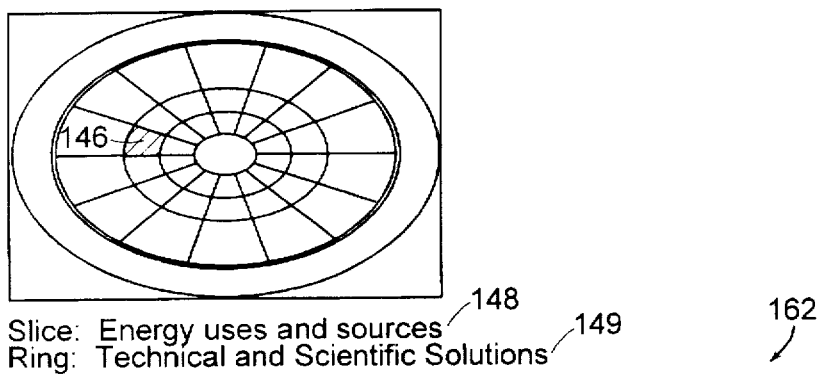

Slice: Energy uses and sources /148
Ring: Technical and Scientific Solutions /149

[Definition/Theory|Indicators|Events|Organizations|Models|Case studies/Profiles|Bibliography|Connectivities|

---

Concepts in this cell: —147            146  162'

Alternative production means —150
[Definition/Theory|Indicators|Events|Organizations|Models|Case studies/Profiles|Bibliography|Connectivity|
{pollution}

154        162"
Efficient use
{Definition/Theory|Indicators|Events|Organizations|Models|Case studies/Profiles|Bibliography|Connectivity|
{cogen, turbine, energy efficiency, improved location & extraction, fuel extraction, proven reserves, gas, coal, pollution control, pollution, hazardous waste, energy efficiency}

Pollution control
[Definition/Theory|Indicators|Events|Organizations|Models|Case studies/Profiles|Bibliography|Connectivity|
{hazardous waste, power plant regulations, reduced use}

Development of Alternative sources
[Definition/Theory|Indicators|Events|Organizations|Models|Case studies/Profiles|Bibliography|Connectivity|
{ethanol, biomass}
              166      158         162'''
Renewable non-polluting sources
{Definition/Theory|Indicators|Events|Organizations|Models|Case studies/Profiles|Bibliography|Connectivity|
{non-polluting energy sources, renewable energy sources, solar, wind, geothermal, tidal, fuel cells, hydrogen, large scale, small scale, long term, short term}

---

Energy uses and sources Outline

BACK to Sustainability Problems
NEXT to Social Solutions

Fig. 5

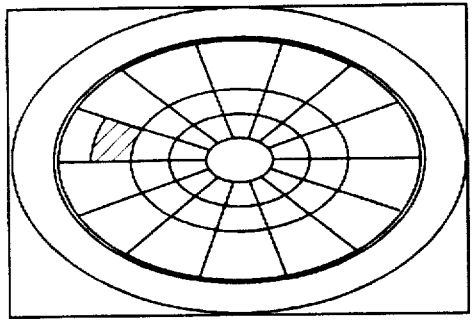

Slice: Energy uses and sources — 148
Ring: Technical and Scientific Solutions — 149
Concept: Renewable non-polluting sources — 162
Data type: Indicators — 163

1994 Wind Energy Industry Status Report — 176

172

A Compendium of Solar Dish/Stirling Technology
International presentation of tech status, performance, operation of dish collectors that use Stirling engines, including development status and operating experience for each system.

Overview of Worldwide Wind Generation, by Paul Gipe
An overview of activities in the US, Europe, including installed capacity, generation, yield, price, and environmental impact.

Return to Renewable non-polluting sources
Return to Energy uses and sources - Technical and Scientific Solutions

Fig. 6

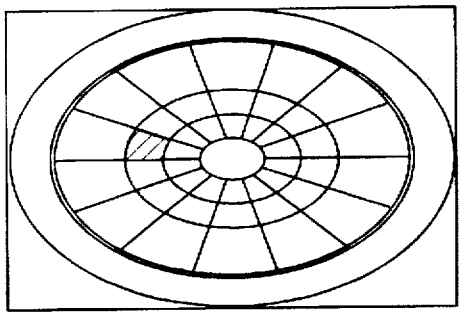

Slice: Energy uses and sources — 148
Ring: Sustainablity Problems — 151
Concept: Depletion of non-renewable resources — 180
Data type: Connectivities — 182

---

Choose slice(s) for which you would like to find connectivities to Depletion of non-renewable resources ☐ mobility ☐ fishing          — 190

☐ forestry
    o
    o
    o
☐ Construction and mining

☐ All

Choose datatype(s) for which you would like to find connectivities to Depletion of non-renewable Resources ☐ definition/theory ☐ Indicators      — 192           194
    o
    o
    o
☐ Events                    | Submit |   | Reset |

☐ All

Fig. 7

NETWORKED DATABASE SYSTEM FOR GEOGRAPHICALLY DISPERSED GLOBAL SUSTAINABILITY DATA

FIELD OF THE INVENTION

The invention relates to a system of networked computer databases in general and specifically to a system and method for using networked computer databases for solving problems requiring global interaction.

BACKGROUND OF THE INVENTION

Global problems typically are multidimensional and require a multidisciplinary global approach for their solution. A global approach requires that governmental, scientific and industrial contributors have access both to the data collected regarding the problem and to the expertise of one another. Such access must be available in, what is in effect, real-time. The recent creation of the Internet (and its hypertext suprastructure the World Wide Web (WWW or Web)) of interconnected computer nodes provided an infrastructure upon which a system for addressing global problems can be built. With such a global communication system in place, multiple users and types of users in different countries at different stages of development can access data distributed over the various nodes of the Web and communicate with one another in what is substantially real time. Such capability permits users in less developed countries to access the technology of more developed countries thereby permitting the less developed countries to increase their rate of development, and the users in more developed countries to better understand and respond to the needs of less developed countries.

However, although the global nature of the Web is an attribute, the sheer size of the Web and the distribution of data over the various Web nodes makes using the Web difficult. Various Web search engines and agents have been developed to help Web users locate data on the Web and sift through the data obtained so as to provide useful data to the user. These programs at best merely obtain data and do not provide any logical links between databases which may be related to the same problem. What is required then is a system to provide an overarching organization to the available data and to provide interactive communications between the various users of the system.

SUMMARY OF THE INVENTION

The invention relates to a system of computers and implemented method for facilitating the identification and storage of data and the communication of information among a plurality of geographically separated entities working together to solve a global problem.

In one embodiment the method includes the step of organizing data relating to a global problem into a plurality of hierarchies of interrelated subproblems stored on a plurality of computer systems interconnected by a network. Each subproblem of the hierarchies belongs to a category having at least one topic and one concept. The method also includes the steps of defining the connectivities between data among and within the hierarchies of interrelated subproblems stored on the plurality of computer systems; providing a mapping between the data related to each subproblem and the computer systems storing the data; and providing access, for each of the entities, to the data within any of the subproblems stored on any of the computer systems in response to the mapping. The method further includes providing access to data and information in any of the plurality of hierarchies of interrelated subproblems on any of the computer systems from any of the subproblems according to the defined connectivities and in response to the mapping, permitting the exchange of information relating to the global problem among said plurality of entities. The method also permits the data and information related to the global problem stored on the plurality of computer systems to be updated interactively by certain entities in response to the communication of information relating to the global problem among the plurality of geographically separated entities.

In another embodiment the invention relates to a system having data relating to a global problem organized into a plurality of hierarchies of interrelated subproblems stored on a plurality of computer systems interconnected by a network. Each subproblem of the hierarchies belongs to a category having at least one topic and one concept. The system defines the connectivities between data among and within the hierarchies of interrelated subproblems. The system maps the data related to each subproblem and the computer systems storing the data and permits access to the data within any of the subproblems stored on any of the computer systems. The method further includes providing access to data and information in any of the plurality of hierarchies of interrelated subproblems on any of the computer systems from any of the subproblems according to the defined connectivities and in response to the mapping, permitting the exchange of information relating to the global problem among said plurality of entities The method also permits the data and information related to the global problem stored on the plurality of computer systems to be updated by certain entities in response to the communication of information relating to the global problem among the plurality of geographically separated entities.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 4 is an embodiment of a graphic of an embodiment of the invention depicting the Concepts associated with a Category and Topic;

FIG. 5 is an embodiment of a graphic of an embodiment of the invention depicting the Concepts associated with the same Category as shown in FIG. 4 but with a different Topic;

FIG. 6 is an embodiment of a graphic of an embodiment of the invention depicting the data for the datatype Indicators associated with a Concept associated with the same Category and Topic as shown in FIG. 5;

FIG. 7 is an embodiment of a graphic of an embodiment of the invention depicting the request screen for the datatype Connectivities associated with Category and Topic as shown in FIG. 4.

DESCRIPTION OF THE PREFERRED EMBODIMENT

Figure 1:
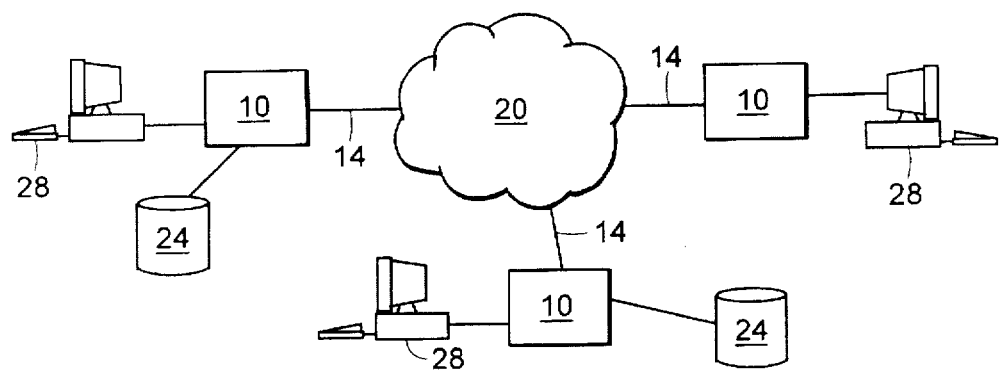
FIG. 1 is a highly schematic block diagram of an embodiment of a computer system of the invention.

In brief overview, the present invention provides intelligence and adaptive order to access the contents of global databases on the Internet accessed as the World Wide Web. Although the present invention utilizes the Internet and World Wide Web for its underlying communication functions, the present invention is also capable of using any network for its communications needs and as such need not be restricted to the Internet and the World Wide Web. The present invention is also designed to engage the research and the policy communities in different parts of the world by "sorting out" the complexities of the Web into some semblance of intellectual order and analytical coherence.

In one embodiment, the present invention has been constructed to help users address the problem of Globally Sustainable Development. This embodiment termed a Global System for Sustainable Development or GSSD includes an agent interface coupled to an intelligent-adaptive service to provide users with rapid access to Web search engines while at the same time providing quality criteria for the identification of data sites and site-specific materials. Although this embodiment is directed toward the problems of Globally Sustainable Development, the system is just as applicable to other widespread global issues such as health and medicine. Overall, the design of the invention recognizes that the problems being addressed are multidimensional in nature and pose a complex set of challenges that cannot be addressed by any simple solution or by a simplified view of either the problem or the proposed solution.

The importance of the interconnection of data derives from the tensions and the interconnections between individual actions, on the one hand, and aggregate outcomes, on the other. Such global problems need to be examined theoretically as well as empirically in order to understand the potential for resolution at both the individual as well as the aggregate levels. This invention helps provide a powerful synthesis of insights and evidence in all of the social sciences bearing on, in this embodiment, growth, development, social change, conflict, and conflict resolution.

The design of the system of the invention is generic in frame, meaning that it is intended to be useful at all levels of analysis, and for a wide range of issues central to the problem. The system reflects an interdisciplinary approach founded on a set of interconnected premises and intellectual orientations. In the embodiment relating to the dilemmas of sustainable development, the organization of data provide insights derived from political science (comparative and international politics, and public policy); economics (neoclassical, development, and ecological economics); business and management (system dynamics, and decision theory); law and new legal reasoning (including new instruments for sustainable development); science and engineering (global change science, ecology, and technology applied to social needs); complexity theory as reflected in emerging understanding of adaptive complex systems; and innovative computational techniques to facilitate access to electronic networks and improve the uses of communication technologies.

Referring to FIG. 1, a system of networked computers suitable for use with the invention includes one or more network nodes 10 interconnected by a communications links 14 to a global network 20 such as the Internet accessed as the World Wide Web. As stated above any network of computers can be used with the system of the invention and the use of the invention is not limited to the Internet or the Web. One or more of the nodes 10 include a database 24 which is stored on a disk or other medium and terminals and other input-output devices 28. Data relating to the global problem to be solved is stored in the databases 24 and is accessed from the terminals 28 located on any node 10 on the Web 20.

Figure 2:
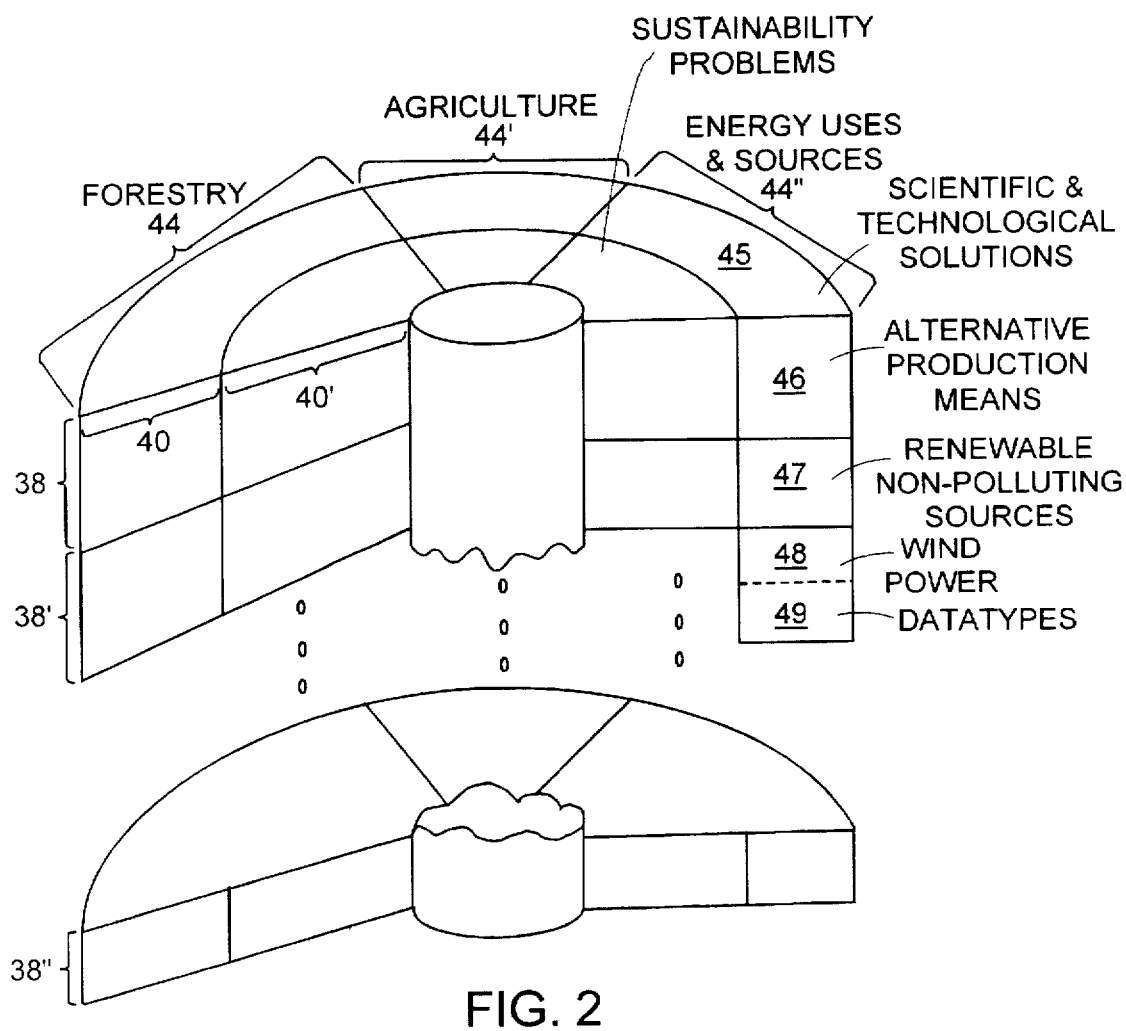
FIG. 2 is a diagrammatic representation of an embodiment of a datastructure used in conjunction of the system of the invention in FIG. 1.

Referring now to FIG. 2, the organization of data stored in the databases 24 on the medium can be represented as a plurality of layered, generally 38, (only three layers shown for clarity) concentric rings, generally 40, (only two shown for clarity) having a plurality of slices, generally 44, (only three shown for clarity). Each slice 44 represents a Category of interest relating to the global problem at hand. In the embodiment here discussed, the problem is of global sustainable development, but other global or geographically dispersed problems are equally addressable using the system of the invention.

Data for the various Categories of the problem of global sustainable development in one embodiment is organized as a plurality of 14 slices 44 (only three labeled for clarity) representing FORESTRY, AGRICULTURE or ENERGY USE & SOURCES. Each ring portion 40, 40' of each slice 44 then represents a Topic of the category. For example in the embodiment shown each Category contains three Topics (only two shown for clarity), SUSTAINABILITY PROBLEMS 40' associated with the Category, and SCIENTIFIC & TECHNICAL SOLUTIONS 40 associated with that Category.

Each layer, generally 38, of the Category, relates to Concepts associated with that Category and Topic. In the embodiment shown the ENERGY USE & SOURCES Category 44" in the TECHNICAL & SCIENTIFIC SOLUTIONS Topic 45 includes the Concepts ALTERNATIVE PRODUCTION MEANS 46 and RENEWABLE NON-POLLUTING SOURCES 47 (only two labeled for clarity). The Concept (generally 38) describes some issue related to the Category 44 and Topic 40 to which it belongs. Each Concept 38 may include one or more Subconcepts 48 such as the Subconcept WIND POWER 48 of the Concept RENEWABLE NON-POLLUTING SOURCES 47. In addition each Concept includes Datatypes 49 which include the relevant datatypes for the Concept.

Figure 2A:
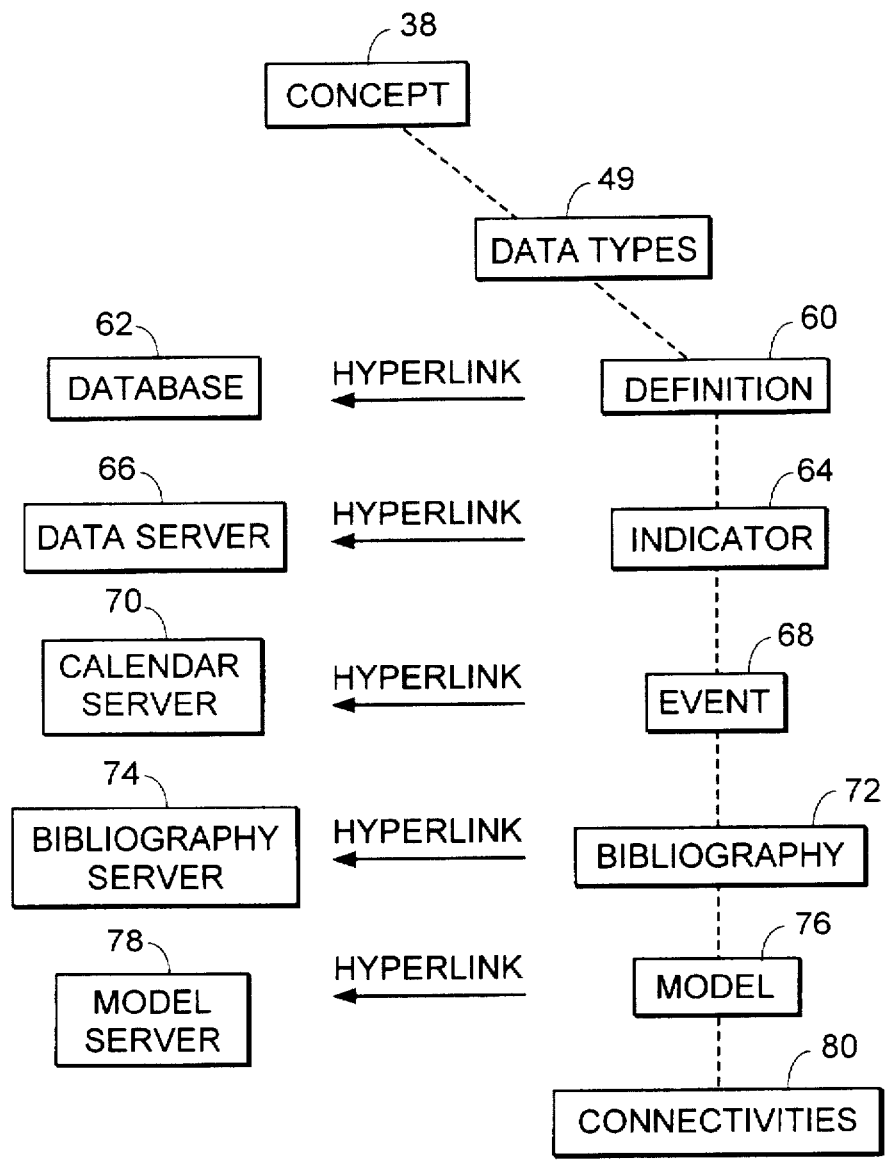
FIG. 2A is a diagrammatic drawing of an embodiment the relationship of the various types of datatypes used in accordance with an embodiment of the invention and the hyperlinks associated with each datatype.

One embodiment of the Datatypes 49 associated with the Concepts 38 is shown in FIG. 2A. In this embodiment, each Concept 38 includes a Definition Datatype 60 which describes the Category 44 to which the Concept 38 belongs. By selecting the Definition Datatype 60, a hyperlink is activated which connects to the definition data stored in a database 62 on medium accessible to the system. A second datatype, in one embodiment Indicator 64, provides hyperlinks to the data servers 66 which contain data regarding the various measurement parameters associated with the Concept 38. For example in the ENERGY USE & RESOURCES Category 44", the SCIENTIFIC & TECHNICAL SOLUTIONS Topic 45, and the ALTERNATIVE PRODUCTION MEANS Concept 46, one hyperlink would point to a dataserver 66 located in the Department of Energy which contains data on the amount of energy generated by alternative energy sources in the United States.

Additionally a Concept 38 may include: an Event datatype 68 which provides a hyperlink to a Calendar Server 70, which provides a list of organizations and events related to the Concept 38; a Bibliography datatype 72 which provides a hyperlink to a Bibliography Server 74 which provides bibliographies relating to the Concept 38; and a Model datatype 76 which provides a hyperlink to a Model Server 78 which provides executable mathematical models which relate to the Concept 38.

An additional datatype for each Concept is Connectivities 80. Each Category, Topic, Concept and Subconcept includes connectivities or links to other Categories, Topics, Concepts or Subconcepts which it affects and by which it is affected. For example, the FORESTRY category 44 affects and is affected by the AGRICULTURE category 44'. That is, as agricultural land increases, the amount of deforestation increases either intentionally due to the cutting down of the forest to create more agriculturally useful land or as a result of forest destruction caused by the increased use of herbicides and insecticides. The connectivities permit a user of the database to move between Categories, Topics, and Concepts.

Thus a user of the Global System for Sustainable Development who wished to review data in databases related to the Category FORESTRY 44 is able to use the connectivities between the various databases to move to the Concept DEFORESTATION and from to the AGRICULTURE Category 44' and access the databases relating to agriculture, and damage caused by agriculture to the forests.

Figure 3:
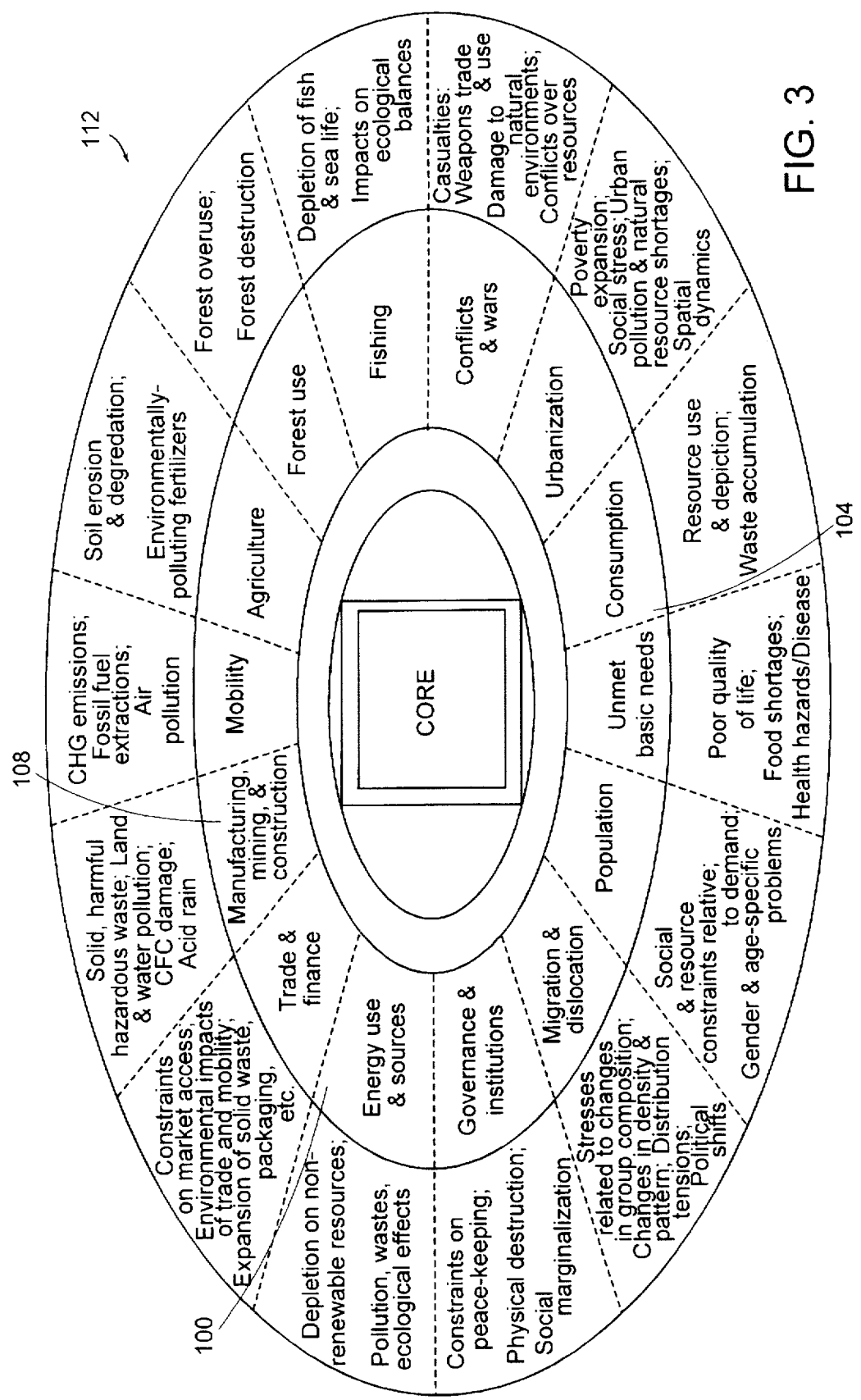
FIG. 3 is an embodiment of a graphic of the main screen of an embodiment of the invention depicting the Categories and Topic relating to the global problem.

In more detail and referring to FIG. 3, a user using the system is presented with a graphic display, displaying a generalized overview of the data structure organization of the global problem addressed by the system. In the embodiment shown, the global problem addressed is one of global sustainable development. The user selects one of the Categories related to the problem, in this embodiment including but not limited to ENERGY USE & SOURCES 100, CONSUMPTION 104, and MANUFACTURING MINING & CONSTRUCTION 108, as indicated in this embodiment by a radial slice of the data structure graphic, and decides what Category and Topic is to be investigated.

The user selects the ring which corresponds to the Topic of interest in the Category of interest. In this embodiment the Topics include but are not limited to SUSTAINABILITY PROBLEMS 112 and SCIENTIFIC & TECHNICAL SOLUTIONS (not shown). In the example shown here, by selecting the SUSTAINABILITY PROBLEMS ring 112 and the ENERGY USE & RESOURCES Category 100, the hyperlink corresponding to that Category and Topic causes the next level of the data structure to be displayed. Referring to FIG. 4, for this level of the data structure, the graphic displays the concepts associated with the Category (slice) and Topic (ring) along with a graphic 116 which shows the Category and Topic 118 relative to the other Categories and Topics. In the embodiment shown, the concepts 120 are DEPLETION OF NON-RENEWABLE RESOURCES 121 and POLLUTION, WASTES & ECOLOGICAL EFFECTS 121'.

The graphic not only displays the concepts for this Category 100 and Topic 112, but also lists the datatypes 124, 124' and 124" available for the Category 100, and each of the Concepts 124, 124". In the embodiment shown the datatypes include but is not limited to INDICATORS 128, EVENTS 132, and CONNECTIVITIES 136. The user may move to a different Topic as indicated by the ring selected by moving to another Topic and hence ring. In the example shown, the user selects 138 to move to the next Topic, SCIENTIFIC & TECHNICAL SOLUTIONS.

Referring to FIG. 5, the selection of SCIENTIFIC & TECHNICAL SOLUTIONS causes the hyperlink to the Topic to activate and causes the new graphic to be displayed 142. In the embodiment shown, the new Topic 146 is displayed and the Concepts 147 associated with the Category 148 and Topic 149 are listed. In the embodiment shown, the Concepts include but are not limited to ALTERNATIVE PRODUCTION MEANS 150, EFFICIENT USE 154 and RENEWABLE NON-POLLUTING SOURCES 158. In each case, the datatypes associated with the Category 148 and Topic 149 and Concepts 162', 162", 162"' are displayed. In this example, the user selects the datatype INDICATORS 166 for the Concept RENEWABLE NON-POLLUTING SOURCES 158 and in doing so the hyperlink corresponding to this datatype is activated.

Referring to FIG. 6, the hyperlink for the INDICATORS 166 (FIG. 5) datatype causes the INDICATOR graphic to be displayed. The INDICATOR graphic contains the data 172 available for the Category 148, Topic 149, Concept 162 and Indicator data type 163 selected. In this example, if the user selects the 1994 Wind Energy Industry Status Report 176, the hyperlink corresponding to this data entry is activated. This system then connects to the node containing the requested report and displays the report.

Referring also to FIG. 7, if the user had for example selected CONNECTIVITIES 126 rather than Concepts 120 for the Category ENERGY USES & SOURCES 148 and the Topic SUSTAINABILITY PROBLEMS 151 (See FIG. 4), the hyperlink corresponding to CONNECTIVITIES 126 would have been activated and the CONNECTIVITIES graphic (FIG. 7) been displayed. This graphic enables a user to determine what CONNECTIVITIES 182 exist between the various datatypes in the various Categories and the Concept DEPLETION OF NON-RENEWABLE RESOURCES 180, in the Topic SUSTAINABILITY PROBLEMS 151, in the Category ENERGY USES & SOURCES 148 by selecting a various Categories 190 and datatypes 192 and submitting them 194. The CONNECTIVITIES returned by the system in response to a CONNECTIVITIES query may either be maintained in a database which is created upon system creation and then updated as necessary, or may be dynamically determined when the connectivities are sought by using a WEB search engine with the appropriate search terms. Alternatively a database of CONNECTIVITIES may be initially defined and then automatically updated by a WEB search engine periodically.

In addition, the system displays a hyperlink on the first page which permits the user to post messages, communicate in real time without others on the net and to electronically mail documents to others using the system. In each case discussed, the use of hypermedia facilitates the construction of the system to one skilled in the art. However, the use of hypermedia and its attendant hyperlinks is not required and the system may be constructed with out such tools. Finally, each database may be appropriately protected to prevent unauthorized users from access to the data.

Having described the preferred embodiments of the invention, it will now become apparent to one of skill in the art that other embodiments incorporating the concepts may be used. It is felt, therefore, that these embodiments should not be limited to the disclosed embodiments but rather should be limited only by the spirit and scope of the following claims.

I claim:

1. A computer implemented method for facilitating the storage of data and the communication of information among a plurality of geographically separated entities working to solve problems related to global sustainability, said method comprising the steps of:

organizing data relating to said global sustainability problems into a plurality of hierarchies of interrelated subproblems of said global sustainability problems stored on media on a plurality of computer systems interconnected by a plurality of communications links, each subproblem of said hierarchies belonging to a category and having at least one topic and one concept;

defining the connectivities between data among and within said hierarchies of interrelated subproblems stored on media on said plurality of computer systems;

providing a mapping between the data related to each of said subproblem and said computer systems of said plurality of computer systems storing said data;

providing access, for each of said plurality of entities, to the data within any of said subproblems stored on media on any of said plurality of computer systems by said plurality of said computer systems in response to said mapping;

providing access to data and information in any of said plurality of hierarchies of interrelated subproblems on any of said computer systems of said plurality of computer systems from any of said subproblems according to said defined connectivities and in response to said mapping;

permitting the exchange of information relating to global sustainability among said plurality of entities permitting said data and information related to global sustainability stored on media on said plurality of computer systems to be updated by selected ones of said plurality of entities in response to said communication of information relating to global sustainability among said plurality of geographically separated entities.

2. The computer implemented method of claim I wherein the communication is substantially in real time.

3. The computer implemented method of claim 1 wherein each category includes a concept.

4. The computer implemented method of claim 3 wherein each concept includes at least one datatype.

5. The computer implemented method of claim 4 wherein said at least one datatype include a connectivity datatype.

6. The computer implemented method implemented method of claim 5 wherein the connectivity datatype provides a hyperlink to other datatypes.

7. A system of computers for facilitating the storage of data and the communication of information among a plurality of geographically separated entities working to solve problems related to global sustainability, said system comprising a plurality of computer systems interconnected by said computer network;

wherein at least two of said plurality of computer systems having data relating to said global sustainability problems in a distributed database located on media, said distributed database organized into a plurality of hierarchies of interrelated subproblems of said global sustainability, each subproblem of said hierarchies belonging to a category and having at least one topic and one concept, wherein each database comprising connectivities between data among and within said hierarchies of interrelated subproblems stored on said at least two computer systems;

wherein a system mapper provides a mapping between the data related to each of said subproblem and said at least two computer systems storing said data;

wherein each of said plurality of computers provides access, for each of said plurality of entities, to the data within any of said subproblems stored on any of said plurality of computer systems by said plurality of said computer systems in response to said mapping according to said defined connectivities and in response to said mapping.

8. The system of claim 7 wherein said database is an object oriented database.

9. The system of claim 7 wherein each category includes a concept.

10. The system of claim 9 wherein each concept includes at least one datatype.

11. The system of claim 10 wherein said at least one datatype includes a connectivity datatype.

12. The system of claim 11 wherein the connectivity datatype provides a hyperlink to other datatypes.

* * * * *